(12) United States Patent
Yan et al.

(10) Patent No.: US 12,031,819 B2
(45) Date of Patent: Jul. 9, 2024

(54) LASER LEVEL METER

(71) Applicant: Techtronic Cordless GP, Anderson, SC (US)

(72) Inventors: Fuming Yan, Dongguan (CN); Liling An, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 17/597,924

(22) PCT Filed: Jul. 31, 2020

(86) PCT No.: PCT/CN2020/106043
§ 371 (c)(1),
(2) Date: Jan. 28, 2022

(87) PCT Pub. No.: WO2021/023096
PCT Pub. Date: Feb. 11, 2021

(65) Prior Publication Data
US 2022/0244049 A1 Aug. 4, 2022

(30) Foreign Application Priority Data
Aug. 2, 2019 (CN) .......................... 201921244080.X

(51) Int. Cl.
*G01C 15/00* (2006.01)
*G01C 9/02* (2006.01)
*G01C 9/34* (2006.01)

(52) U.S. Cl.
CPC ............. *G01C 15/004* (2013.01); *G01C 9/02* (2013.01); *G01C 9/34* (2013.01)

(58) Field of Classification Search
CPC .......... G01C 15/004; G01C 9/02; G01C 9/34
See application file for complete search history.

(56) References Cited

U.S. PATENT DOCUMENTS

| | | | |
|---|---|---|---|
| 6,382,574 B1 * | 5/2002 | Pando | F16B 47/00 248/205.8 |
| 7,174,648 B2 * | 2/2007 | Long | G01C 15/004 33/291 |
| 7,322,116 B2 * | 1/2008 | Long | G01C 15/004 248/205.5 |
| 11,154,170 B2 * | 10/2021 | Thomas | G05D 1/0274 |

(Continued)

FOREIGN PATENT DOCUMENTS

| | | |
|---|---|---|
| CN | 1743141 A | 3/2006 |
| CN | 101122459 A | 2/2008 |

(Continued)

*Primary Examiner* — John Fitzgerald
*Assistant Examiner* — Tania Courson
(74) *Attorney, Agent, or Firm* — Dority & Manning, P.A.

(57) ABSTRACT

A laser level meter, comprising a housing, wherein a laser assembly is mounted on the housing, the lower end portion of the housing is further provided with an end cover, the end cover is recessed towards the interior of the housing to form a cavity, and an air suction port is provided in the cavity. The laser level meter further comprises a suction device arranged in the housing, wherein the suction device comprises a fan, and the fan rotates so as to suck air between the cavity and a mounting surface of the laser level meter from the air suction port.

9 Claims, 3 Drawing Sheets

(56) References Cited

U.S. PATENT DOCUMENTS

| | | | |
|---|---|---|---|
| 11,172,607 B2 * | 11/2021 | Hahn | A01D 34/74 |
| 2004/0205972 A2 * | 10/2004 | Wu | G01C 15/00 |
| | | | 33/286 |
| 2005/0198845 A1 * | 9/2005 | Robinson | G01C 15/004 |
| | | | 33/227 |
| 2007/0101594 A1 | 5/2007 | Long et al. | |

FOREIGN PATENT DOCUMENTS

| | | |
|---|---|---|
| CN | 203122277 U | 8/2013 |
| CN | 203953106 U | 11/2014 |
| CN | 210268646 U | 4/2020 |

\* cited by examiner

LASER LEVEL METER

This application claims the priority of the Chinese patent application with application number 201921244080.X filed on Aug. 2, 2019, the entire contents of which are incorporated herein by reference.

TECHNICAL FIELD

The present disclosure relates to a laser level, in particular to a laser level having a suction attachment apparatus and a spirit level assembly, the laser level being attached by suction to a mounting surface by means of the suction attachment apparatus, wherein the levelness of the level is checked by means of the spirit level assembly.

BACKGROUND ART

Laser levels are a common laser alignment product. Due to their high calibration accuracy, simple operation, and convenience of carrying, they are widely used in the construction industry as well as in the construction or installation of large-scale machinery and equipment. Most existing laser levels are fixed to a mounting surface by means of fasteners, but this method of fixing makes it difficult to move the level, so mounting flexibility is poor. To enable a laser level to be fixed more easily and flexibly to a mounting surface, the prior art includes a solution whereby a suction apparatus is provided in the level to mount and position the level. Specifically, the suction apparatus has a motor and a pump; during operation, the pump is driven by the motor to suck air from a bottom housing mounting zone, so as to expel the air from the bottom housing mounting zone, thus forming negative pressure and thereby fixing the laser level to the mounting surface.

However, the suction apparatus consisting of the motor and pump in the prior art described above still needs many other auxiliary components in order to attach the level to the mounting surface by suction. For example, a soft rubber such as TPE (e.g. TPE 350A2) needs to be used on the bottom housing for sealing, and a soft hose, etc. for sucking air needs to be provided between the pump and the bottom housing mounting zone. This type of laser level in the prior art has a relatively complex overall structure; furthermore, laser levels with the suction apparatus described are suitable for use on smooth mounting surfaces, but are difficult to reliably attach to more complex mounting surfaces (rough and uneven mounting surfaces) by suction.

Laser levels in the prior art are generally provided with one or more spirit levels for calibrating the levelness of the level, for example being provided with two spirit levels, one of which is used for X axis calibration while the other is used for Y axis calibration. However, when each spirit level is fitted, fitting adjustment and retesting are needed, which not only increases the fitting time but will also affect the precision of the level.

SUMMARY OF THE DISCLOSURE

To solve the above problems, the present disclosure provides a laser level, comprising: a housing, with a laser assembly mounted on the housing, a lower end of the housing being further provided with an end cover, the end cover being sunk toward the inside of the housing to form a cavity, the cavity being provided with a gas suction port; wherein the laser level further comprises: a suction attachment apparatus arranged in the housing, the suction attachment apparatus comprising a fan, the fan rotating to suck air from between the cavity and a mounting surface of the laser level through the gas suction port.

Optionally, the fan is a centrifugal fan.

Optionally, the suction attachment apparatus further comprises a motor, the motor driving the fan to rotate.

Optionally, a partition plate dividing the housing into an upper part and a lower part is provided inside the housing, wherein the laser assembly is mounted in the upper part of the housing, and the suction attachment apparatus is mounted in the lower part of the housing; the suction attachment apparatus is mounted on the partition plate by means of a motor seat, and an output shaft of the motor is connected to the fan through a central hole in a hub of the fan; the cavity is sunk toward the inside of the housing directly opposite the fan.

Optionally, a bottom of the cavity is provided with one or more said gas suction port, the gas suction port being provided in the bottom in such a way as to correspond to a distribution position of a blade of the fan.

Optionally, the laser level further comprises a spirit level assembly mounted on the housing.

Optionally, the spirit level assembly comprises a spirit level for X-axis orientation, a spirit level for Y-axis orientation, and a carrying member for carrying the spirit levels, the two spirit levels being integrally mounted in a mutually perpendicular state on the carrying member, and the carrying member being mounted on the housing.

Optionally, a mounting position for mounting the laser assembly is further provided on the carrying member, the laser assembly being integrally mounted at the mounting position.

Optionally, a top cover is further mounted at an upper end of the housing, the top cover being provided with an observation hole for observing the spirit level assembly at a position corresponding to the spirit level assembly.

Optionally, a protective cover for protecting the laser assembly is further mounted on the housing, the protective cover being provided with a standard hole for emission of a laser beam of the laser assembly.

With the adoption of the solution described above, the present disclosure has the following beneficial effects: The laser level in the present disclosure is reliably fixed to a reference mounting surface to be tested by means of the suction attachment apparatus during use. Sufficient suction to position the level on a complex, non-smooth mounting surface can be generated quickly through the driving of the fan by the motor in the suction attachment apparatus to generate suction. Thus, the laser level in the present disclosure can be used in complex mounting environments, so practicality is increased. Moreover, compared with the suction apparatus consisting of a motor and a pump in the prior art, the structure of the motor and the fan is more simple and compact. Furthermore, compared with the prior art, components such as the soft sealing rubber and the hose are also dispensed with, thus simplifying the structure. In the present disclosure, it is the spirit level assembly that calibrates the levelness of the level, and by integrating two spirit levels as a single piece, it is possible to ensure that the two spirit levels are oriented correctly with respect to one another. Thus, during production, assembly, and use by the user, the levelness of the level can be calibrated merely by adjusting the level in one axial direction. Moreover, the fact that the spirit level assembly is integrally formed not only ensures precision but also reduces the processing cost and the assembly cost, thus increasing production efficiency.

REFERENCE LABELS

Figure 1:
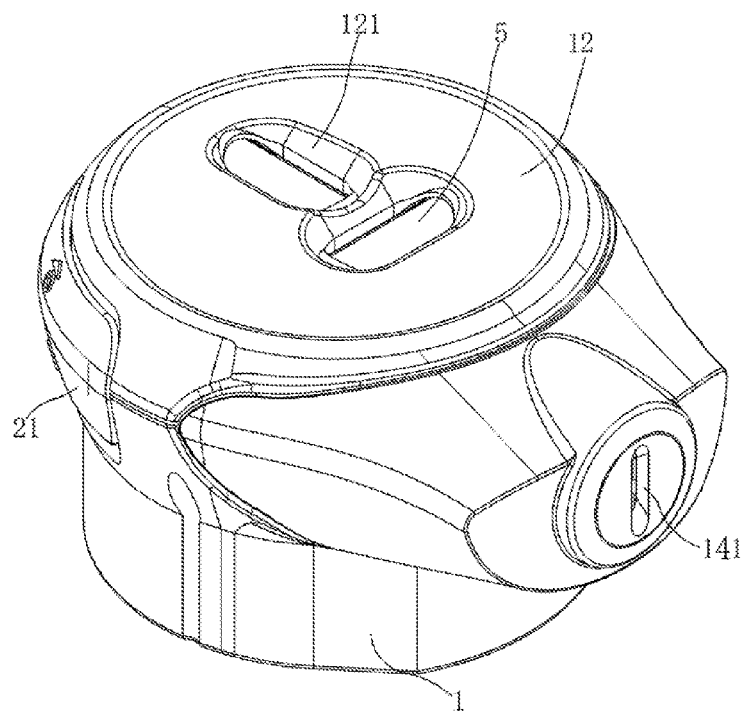
FIG. 1 is a schematic drawing of the appearance of the laser level according to an embodiment of the disclosure.

1—housing; 11—partition plate;
111—gas discharge port; 12—top cover;
121—observation hole; 13—end cover;
131—cavity; 132—gas suction port;
133—bottom; 14—protective cover;
141—standard hole; 2—power supply apparatus;
21—power supply switch; 3—laser assembly;
31—laser emitter; 32—lens;
33—lens support; 4—suction attachment apparatus;
41—fan; 411—hub;
412—blade; 42—motor;
421—output shaft; 43—motor seat;
5—spirit level assembly; 51, 52—spirit levels;
53—carrying member; 54—mounting position.

DETAILED DESCRIPTION OF EMBODIMENTS

Hereinafter, the present disclosure will be explained based on the embodiments shown in the drawings. The embodiments disclosed here can be considered to be illustrative in all aspects and not restrictive. The scope of the present disclosure is not limited by the description of the following embodiments, being indicated only by the scope of the claims, and includes all variants having the same meaning as the scope of the claims and falling within the scope of the claims.

Figure 2:
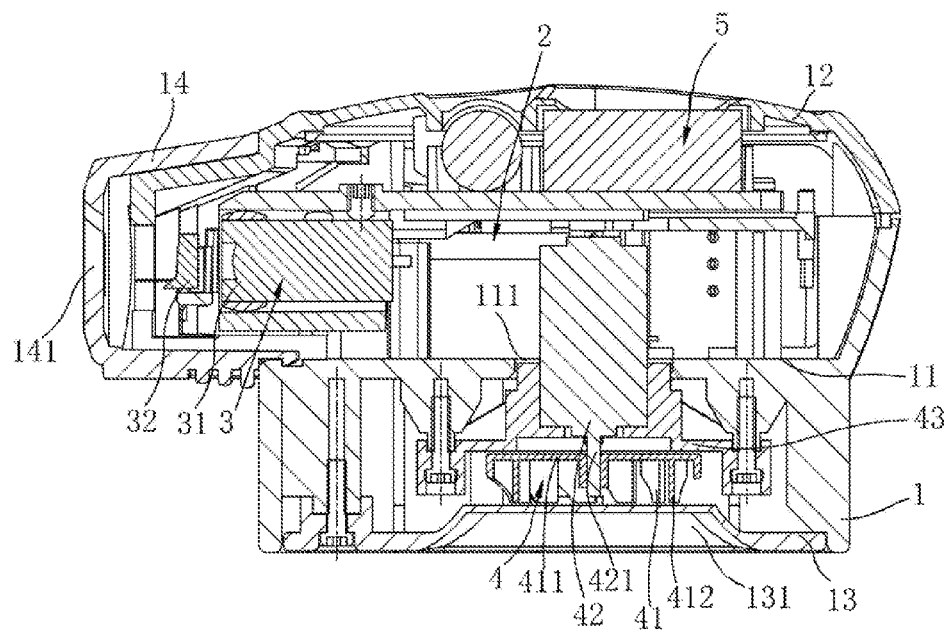
FIG. 2 is a sectional view of the laser level according to an embodiment of the disclosure.

Some embodiments of the present disclosure provide a laser level, as shown in FIGS. 1 and 2. The laser level comprises a housing 1, and a partition plate 11 dividing the housing 1 into an upper part and a lower part is provided inside the housing 1, wherein a power supply apparatus 2 and a laser assembly 3 connected to the power supply apparatus 2 are installed in the upper part of the housing 1. The laser assembly 3 emits an alignment laser beam through a hole in the housing 1, to indicate a reference plane along a mounting surface. A suction attachment apparatus 4 for fixing the laser level to the mounting surface is installed in the lower part of the housing 1. The suction attachment apparatus 4 comprises a fan 41 and a motor 42 which drives the fan 41 to rotate. In some embodiments, the fan 41 is a centrifugal fan, an axial-flow fan or any other suitable type of fan. In some embodiments, the motor 42 is also connected to the power supply apparatus 2, and shares the power supply apparatus 2 with the laser assembly 3. A top cover 12 is also mounted on an upper end of the housing 1; components such as the laser assembly 3 installed in the upper part of the housing 1 are accommodated inside the housing 1 by means of the top cover 12. A lower end of the housing 1 is also provided with an end cover 13. In some embodiments, the top cover 12 and/or end cover 13 is/are integrally formed with the housing 1. In some embodiments, the end cover 13 is sunk toward the inside of the housing 1 to form a cavity 131, and one or more gas suction ports 132 are provided in the cavity 131 (see FIG. 3). In some embodiments of the present disclosure, a spirit level assembly 5 for checking whether the level is in a level state on the mounting surface is also mounted on the laser level.

Figure 3:
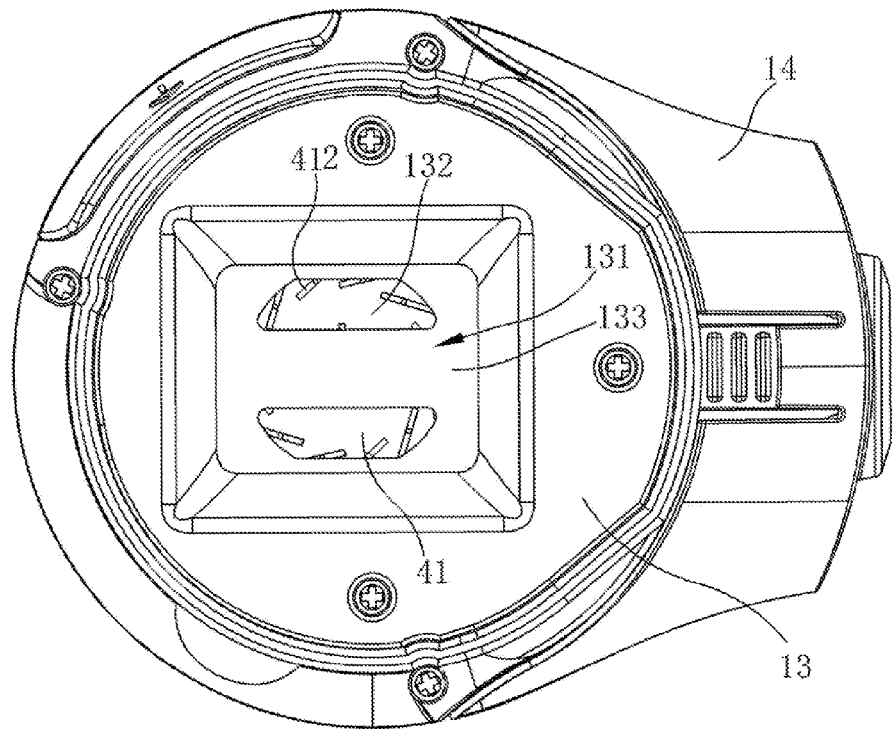
FIG. 3 is a schematic drawing of the bottom of the laser level according to an embodiment of the disclosure.

FIGS. 2 and 3 show the detailed structure of the laser level in some embodiments of the present disclosure. As shown in FIGS. 2 and 3, the suction attachment apparatus 4 is fixed to the partition plate 11 by means of a motor seat 43, and an output shaft 421 of the motor 42 is connected to the fan 41 in a fixed manner through a central hole in a hub 411 of the fan 41. Once the motor 42 is switched on, the motor 42 drives the fan 41 to rotate continuously, sucking air from between the cavity 131 in the end cover 13 and the mounting surface via the gas suction ports 132, so that the space between the end cover 13 and the mounting surface is in a negative pressure state, thereby making use of atmospheric pressure to attach the level to the mounting surface by suction. In some embodiments of the present disclosure, the motor 42 is arranged in such a way as to pass through the partition plate 11, and a gas discharge port 111 for gas discharge is reserved in the region where the motor passes through the partition plate. The air sucked by the suction attachment apparatus 4 is discharged via this region, and is then discharged to the outside of the level via a standard hole 141 which is described below. Additionally, it may also be discharged through an observation hole 121 which is described below, or another gap may be provided for gas discharge.

As shown in FIG. 3, in some embodiments of the present invention, the cavity 131 in the end cover 13 is formed at a position opposite the fan 41; preferably, the cavity 131 is formed directly opposite the fan 41. The cavity 131 is formed in such a way as to be sunk toward the inside of the housing 1, and preferably the cavity 131 has a larger opening at the end cover 13 side and a smaller opening at the side where it is sunk toward the inside of the housing 1; such a structure is more helpful for sucking air. Sides of the cavity 131 may be flat surfaces, but may also be arc-shaped surfaces with a given curvature. The cavity 131 preferably has an isosceles trapezoid-shaped cross section. However, in the embodiments of the present disclosure, the cavity 131 is not restricted to the shapes mentioned above, as long as it is able to realize a channel for sucking air. A bottom 133 of the cavity 131 is in the form of a flat surface or an approximately flat surface, and the size thereof is slightly larger than or equal to the diameter of the fan 41. One or more gas suction ports 132 are provided in the bottom of the cavity, and the gas suction ports 132 are preferably provided below and close to blades 412 of the fan 41. In some embodiments of the present disclosure, two gas suction ports 132 are specifically provided, the two gas suction ports 132 being provided in the bottom 133 in such a way as to correspond to distribution positions of the blades 412. Both gas suction ports 132 are trapezoidal overall, being provided symmetrically in the bottom 133. In this embodiment, the shape of the gas suction port 132 is not limited to this, and may also be set to be rectangular, round, etc.

Figure 5:
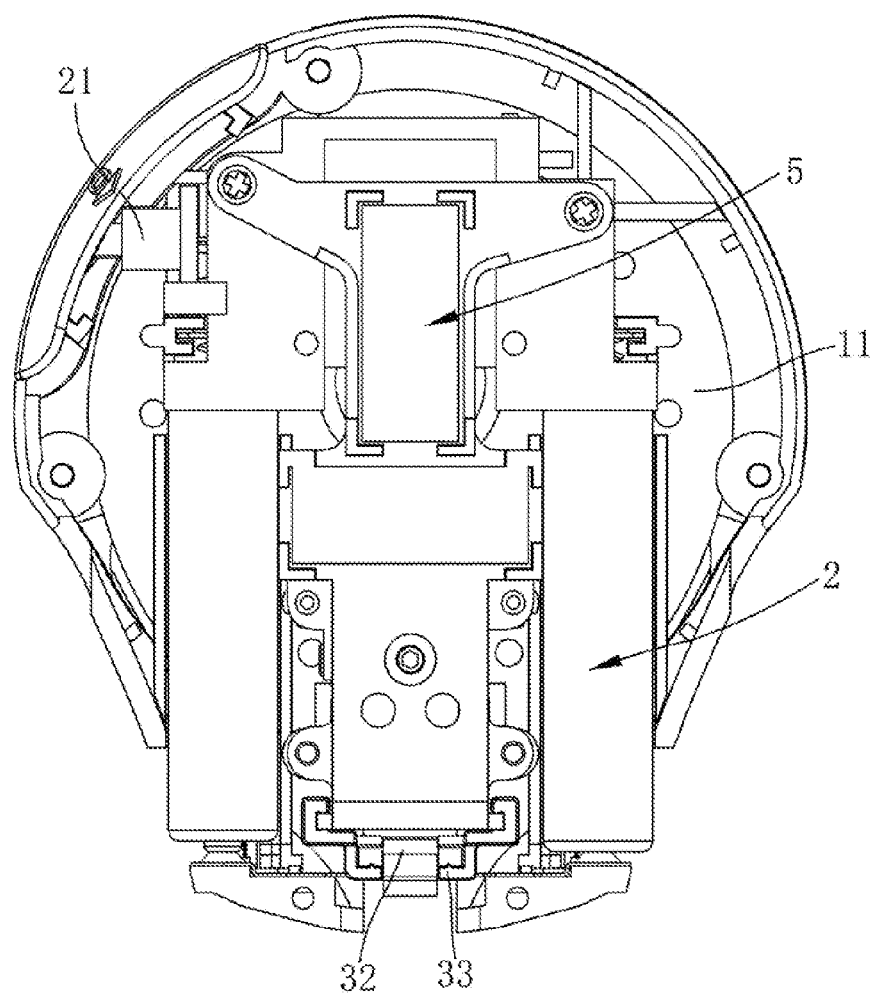
FIG. 5 is a diagram showing the relationship among the installation positions of various components in the laser level according to an embodiment of the disclosure.

In some embodiments of the present disclosure, the spirit level assembly 5 is formed by integrating two spirit levels as a single piece. The spirit level assembly 5 comprises a spirit level 51 for X-axis orientation and a spirit level 52 for Y-axis orientation. When the spirit level assembly 5 is manufactured, adjustments are made so that the two spirit levels are mounted in a mutually perpendicular state on a carrying member 53. The spirit level assembly 5 is then mounted as a single piece on the upper part of the housing 1 by means of a connecting member, as shown in FIG. 5. Specifically, the spirit level assembly 5 is mounted by being supported by a rib plate extending from the partition plate 11 toward the top cover 12 side. Observation holes 121 are provided in the top cover 12 at positions corresponding to the spirit levels 51, 52 in the spirit level assembly 5; the user observes the spirit levels through the observation holes 121. In some embodiments of the present disclosure, having the two spirit levels integrated as a single piece makes it possible to ensure that the two spirit levels are oriented correctly with respect to one another and further to guarantee mounting precision and measurement precision, and it is thus also possible to further reduce the processing cost and assembly cost.

Figure 4:
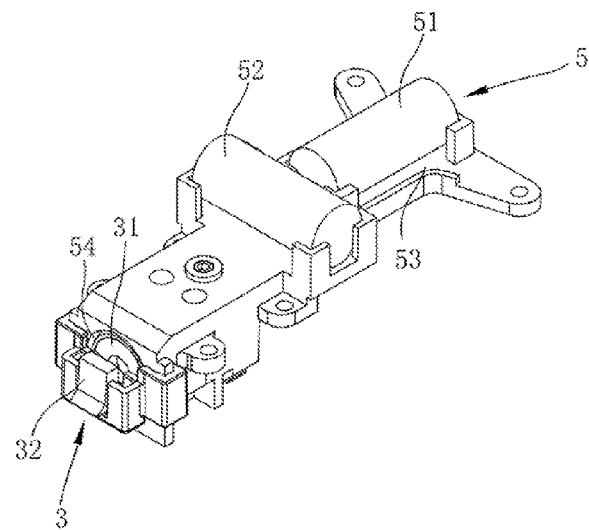
FIG. 4 is a schematic structural drawing of the spirit level assembly of the laser level according to an embodiment of the disclosure.

As shown in FIG. 4, in some embodiments of the present disclosure, a mounting position 54 for mounting the laser assembly 3 may also be formed on the carrying member 53. That is to say, in the course of production, the laser assembly 3 is also integrally mounted on the spirit level assembly 5, and this is used as a single piece. Specifically, the laser assembly 3 comprises a laser emitter 31, and a lens 32 for focusing laser light emitted by the laser emitter 31. The laser emitter 31 is mounted in a mounting hole at the mounting position 54, and the lens 32 is then arranged in front of the laser emitter 31. The lens 32 is carried by a lens support 33 and positioned in front of the laser emitter 31; the lens support 33 may be fixed to the carrying member 53 by means of a snap-fit structure or by screw connection, etc. In this way, i.e. by properly adjusting the positional relationship between the laser assembly and the spirit levels in the course of production, it is possible to further guarantee mounting precision and measurement precision, and it is thus also possible to further reduce the processing cost and assembly cost; integration as a single piece can also better ensure the relative positional relationships among the various components thereon. In addition, it is also possible for only the laser emitter 31 in the laser assembly 3 to be mounted on the carrying member 53, with the laser emitter 31 and the spirit level assembly 5 integrated as a single piece, and used as a single piece. Of course, it is also possible for only the spirit level assembly 5 to be a single piece, with the laser assembly 3 being separately mounted in an upper region of the housing 1.

In some embodiments of the present disclosure, holes for emission of a laser beam are provided correspondingly in the housing 1 and the top cover 12, at positions where the laser beam of the laser assembly 3 is emitted. In addition, a protective cover 14 for further protecting the laser assembly 3 may also be provided; the protective cover 14 is connected to the top cover 12 and the housing 1, and provided with a standard hole 141 for emission of the laser beam.

In some embodiments of the present disclosure, the laser assembly 3 and the suction attachment apparatus 4 share the power supply apparatus 2. As shown in FIG. 5, the power supply apparatus 2 is a battery pack, which may be a rechargeable battery pack such as a lithium ion battery or a nickel cadmium battery, but may also be a removable alkaline battery. A power supply switch 21 of the power supply apparatus 2 is also correspondingly provided on a sidewall of the housing 1; the power supply switch 21 may be a sliding switch as shown in the figure, or another form of switch. In some embodiments of the present disclosure, the battery pack is mounted on the partition plate 11 and distributed at two sides of the laser assembly 3. Such an arrangement enables full use of the space in the upper part of the housing 1, thus reducing the overall volume of the level. In this embodiment, the laser assembly 3 and the motor 42 share the power supply apparatus 2, but separate power supplies and respectively corresponding power supply switches could of course be provided instead.

In some embodiments of the present disclosure, the motor 42 is mounted in such a way as to partially pass through the partition plate 11, i.e. part of the motor 42 is located in an upper region of the housing 1 and part is located in a lower region of the housing 1. Such a configuration can make the structure of the level more compact. The motor 42 may of course also be mounted in the lower part of the housing 1.

In some embodiments of the present disclosure, the end cover 13 is made of a material such as hard rubber (ABS 121H); the fan is driven to rotate at high speed by the motor, and air is sucked by the fan to form negative pressure in order to attach the level to a flat mounting surface such as a wall by suction, without the need to provide soft rubber on the end cover for sealing, as is the case in the prior art.

In some embodiments of the present disclosure, the laser emitter 31 in the laser assembly 3 employs a common laser emitting component such as a semiconductor laser, etc., and specifically may employ a light-emitting diode for example.

In some embodiments of the present disclosure, replacing the pump in the prior art with a fan structure not only simplifies the structure of the suction attachment apparatus, making the level more compact overall, but air between the cavity and the mounting surface can be rapidly sucked through rotation of the fan under the driving action of the motor, and it is thus possible to fix the level to the mounting surface as quickly as possible. Sufficient suction to attach the level to a non-smooth mounting surface by suction can be generated quickly through driving of the fan by the motor, thus increasing the practicality of the level. Secondly, the structural simplification of the suction attachment apparatus also reduces the difficulty of disassembly, facilitating overhaul and maintenance, and thus reducing the cost of use.

The invention claimed is:

1. A laser level, comprising:
a housing, a partition plate dividing the housing into an upper part and a lower part, a laser assembly mounted on the partition plate in the upper part of the housing, a lower end of the lower part of the housing being further provided with an end cover, the end cover being sunk toward the inside of the housing to form a cavity, the cavity being provided with a gas suction port;
a protective cover for protecting the laser assembly is further mounted on the housing, the protective cover being provided with a standard hole for emission of a laser beam of the laser assembly;
the laser level further comprising: a suction attachment apparatus arranged in the housing, the suction attachment apparatus comprising a fan in the lower part of the housing, the fan rotating to suck air from between the cavity and a mounting surface of the laser level through the gas suction port, the air sucked by the fan being discharged from the lower part of the housing to the upper part of the housing through a gas discharge port, and from the upper part of the housing to an environment outside the laser level through the standard hole.

2. The laser level as claimed in claim 1, wherein:
the fan is a centrifugal fan.

3. The laser level as claimed in claim 1, wherein:
a bottom of the cavity is provided with one or more said gas suction port, the gas suction port being provided in the bottom in such a way as to correspond to a distribution position of a blade of the fan.

4. The laser level as claimed in claim 1, wherein:
the suction attachment apparatus further comprises a motor, the motor driving the fan to rotate.

5. The laser level as claimed in claim 4, wherein:
the suction attachment apparatus is mounted on the partition plate by means of a motor seat, and an output shaft of the motor is connected to the fan through a central hole in a hub of the fan;
the cavity is sunk toward the inside of the housing directly opposite the fan.

6. The laser level as claimed in claim 1, wherein:
the laser level further comprises a spirit level assembly mounted on the housing.

7. The laser level as claimed in claim 6, wherein:
the spirit level assembly comprises a spirit level for X-axis orientation, a spirit level for Y-axis orientation, and a carrying member for carrying the spirit levels, the two spirit levels being integrally mounted in a mutually perpendicular state on the carrying member, and the carrying member being mounted on the housing.

8. The laser level as claimed in claim 7, wherein:
a mounting position for mounting the laser assembly is further provided on the carrying member, the laser assembly being integrally mounted at the mounting position.

9. The laser level as claimed in claim 6, wherein:
a top cover is further mounted at an upper end of the housing, the top cover being provided with an observation hole for observing the spirit level assembly at a position corresponding to the spirit level assembly.

\* \* \* \* \*